United States Patent [19]

Yamamoto et al.

[11] Patent Number: 5,636,088
[45] Date of Patent: Jun. 3, 1997

[54] HEAD ASSEMBLY CONTROLLING DISTORTION DUE TO TEMPERATURE VARIATION AND DISK APPARATUS USING THE HEAD ASSEMBLY

[75] Inventors: Kotaro Yamamoto, Tokyo; Norio Yoshikawa, Yokohama; Masahito Yamaguchi, Tokyo; Masaaki Habata, Tokyo; Koji Osafune, Tokyo; Toshiaki Hattori, Tokyo; Toshikuni Sato, Kawasaki, all of Japan

[73] Assignee: Kabushiki Kaisha Toshiba, Kawasaki, Japan

[21] Appl. No.: 346,247

[22] Filed: Nov. 23, 1994

[30] Foreign Application Priority Data

Nov. 25, 1993 [JP] Japan ................. 5-295200

[51] Int. Cl.$^6$ ................. G11B 5/48; G11B 21/24
[52] U.S. Cl. ................. 360/104
[58] Field of Search ................. 360/102, 103, 360/104

[56] References Cited

U.S. PATENT DOCUMENTS

| | | | |
|---|---|---|---|
| 5,021,906 | 6/1991 | Chang et al. | 360/103 |
| 5,377,064 | 12/1994 | Yaginuma et al. | 360/104 |
| 5,381,288 | 1/1995 | Karam, II | 360/104 |
| 5,434,731 | 7/1995 | Hagen | 360/104 |
| 5,467,236 | 11/1995 | Hatanai et al. | 360/104 |

FOREIGN PATENT DOCUMENTS

| | | |
|---|---|---|
| 60-182574 | 9/1985 | Japan . |
| 1-133362 | 9/1989 | Japan . |
| 3-110628 | 11/1991 | Japan . |
| 5-080920 | 4/1993 | Japan . |

*Primary Examiner*—John H. Wolff
*Assistant Examiner*—George J. Letscher
*Attorney, Agent, or Firm*—Finnegan, Henderson, Farabow, Garrett & Dunner, L.L.P.

[57] ABSTRACT

The dimension ratio t/H of the thickness t of a flexure spring to the height (thickness) H of a slider 17 is set at 0.047 or less in order to reduce the variation in crown amount due to a temperature variation. As the ratio of the thickness t of the flexure spring to the height H of the slider decreases, the stress acting in the slider due to a difference in linear expansion coefficient between itself and the flexure spring decreases and the rigidity of the slider increases relative to the flexure spring. The dimension ratio H/L of the height H of the slider to the length L thereof is set at 0.245 or more. As the dimension ratio H/L increases, the rigidity of the slider increases and the amount of deformation of the slider due to a difference in linear expansion coefficient between itself and the flexure spring decreases. In addition, the ratio A2/A1 of an actual adhesion area A2 between the slider and a slider fixing portion of the flexure spring to a possible adhesion area A1 therebetween is reduced to 0.42 or less. Moreover, a temperature compensation member is adhered to the slider or the flexure spring.

2 Claims, 15 Drawing Sheets

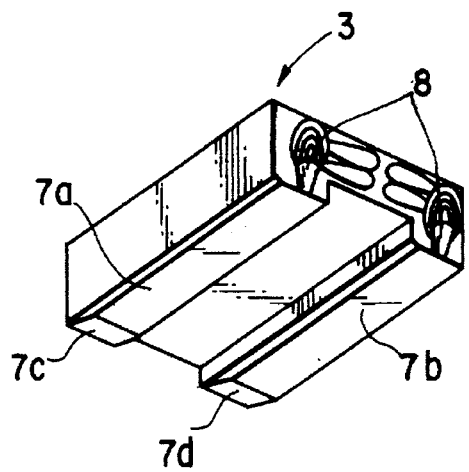
F I G. 3
(PRIOR ART)
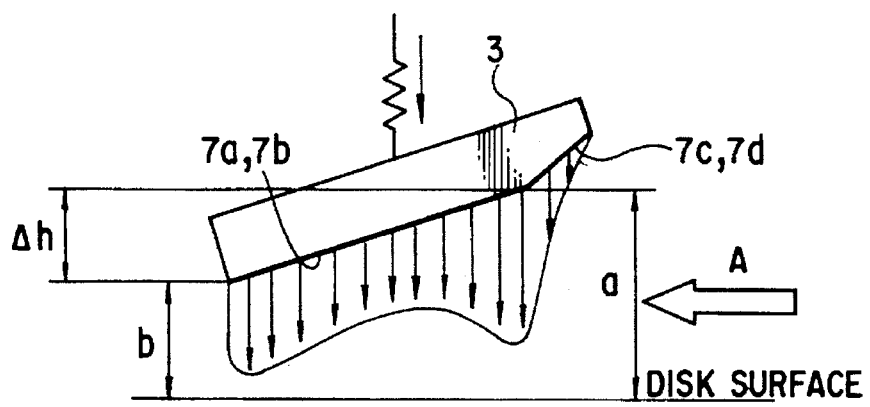
F I G. 4 (PRIOR ART)
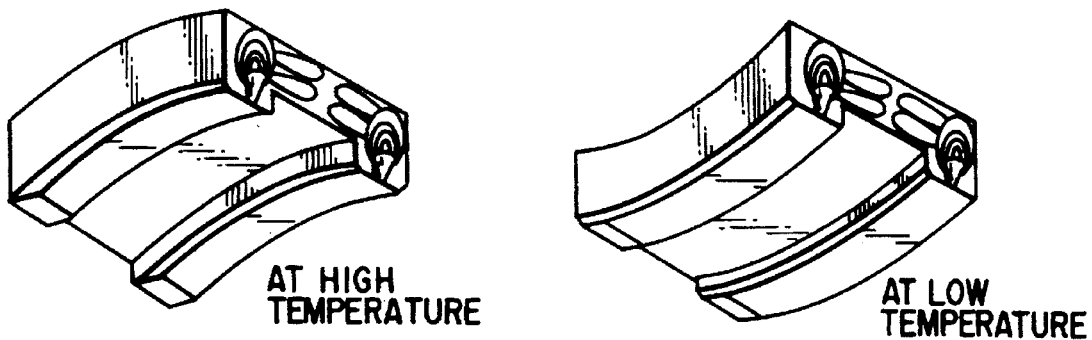
F I G. 5A
(PRIOR ART)
F I G. 5B
(PRIOR ART)

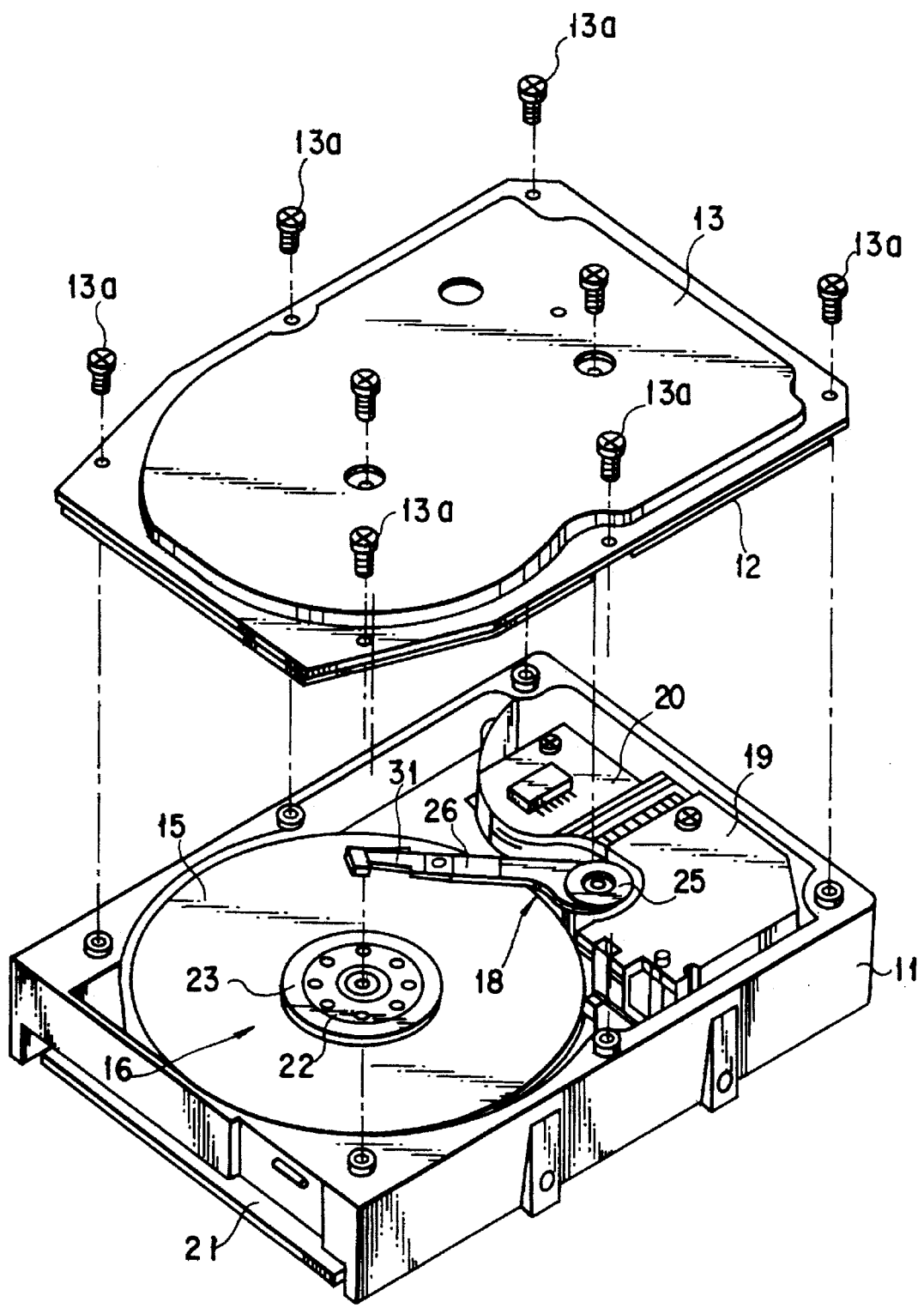
F I G. 10

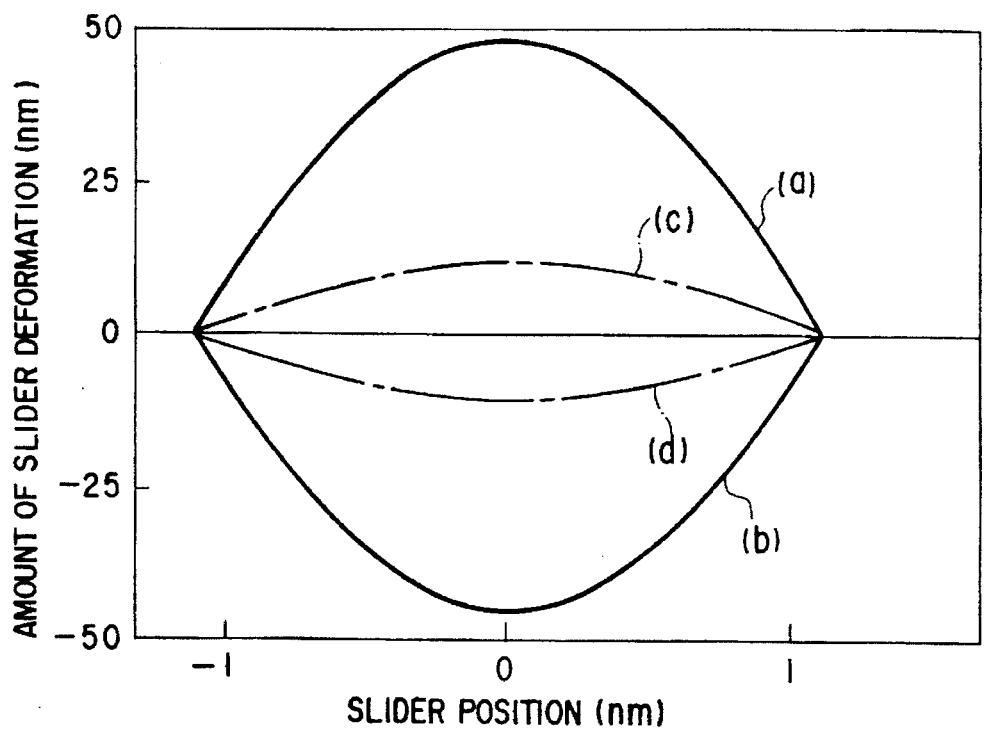
F I G. 11
| FLEXURE MATERIAL | | TEMPERATURE |
|---|---|---|
| (a) | SUS 304 | HIGH TEMPERATURE (+25°C) |
| (b) | ↓ | LOW TEMPERATURE (−25°C) |
| (c) | SUS 420 | HIGH TEMPERATURE (+25°C) |
| (d) | ↓ | LOW TEMPERATURE (−25°C) |
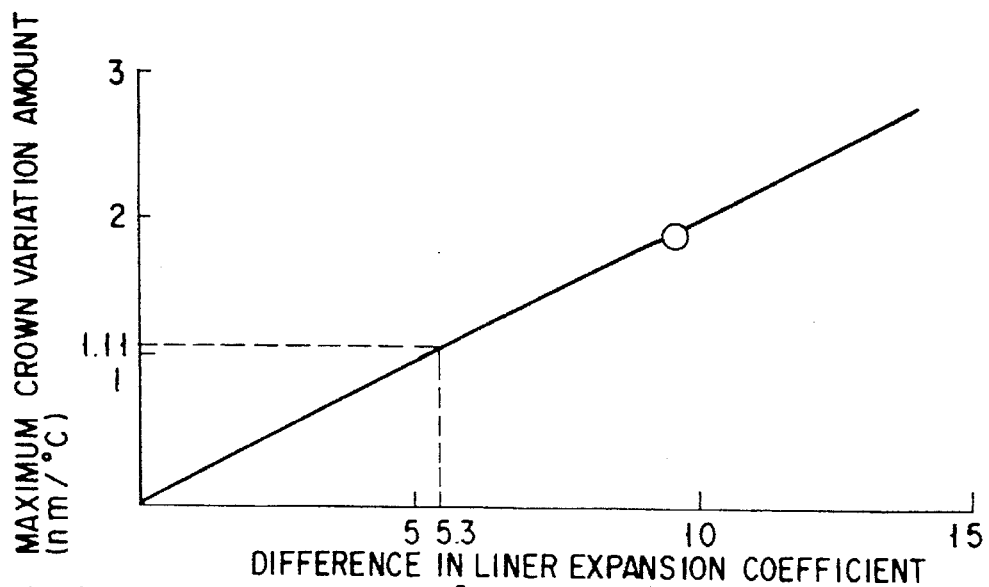
F I G. 12

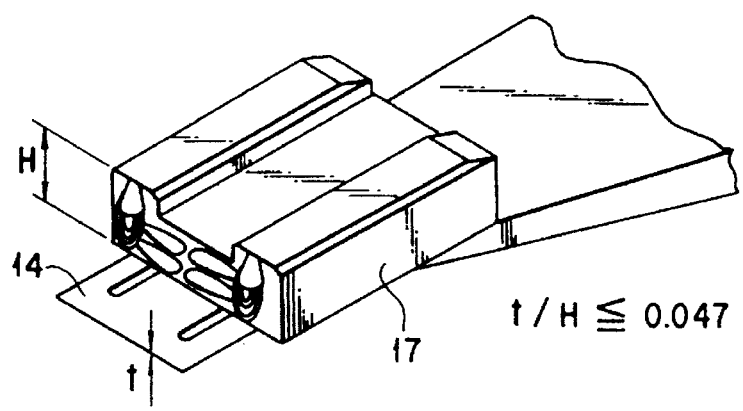
FIG. 13    $t/H \leq 0.047$
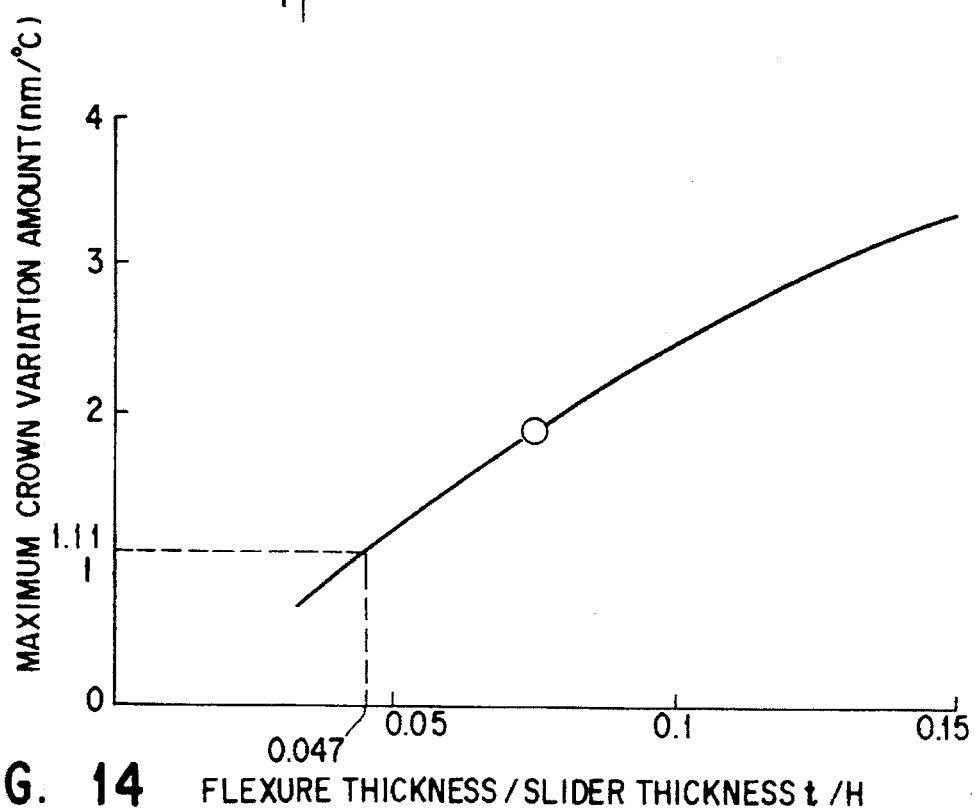
FIG. 14    FLEXURE THICKNESS / SLIDER THICKNESS $t/H$
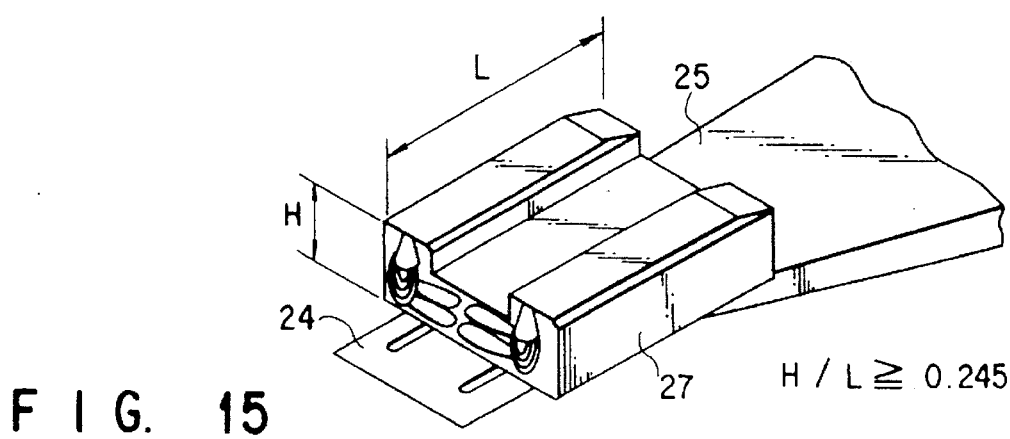
FIG. 15    $H/L \geq 0.245$

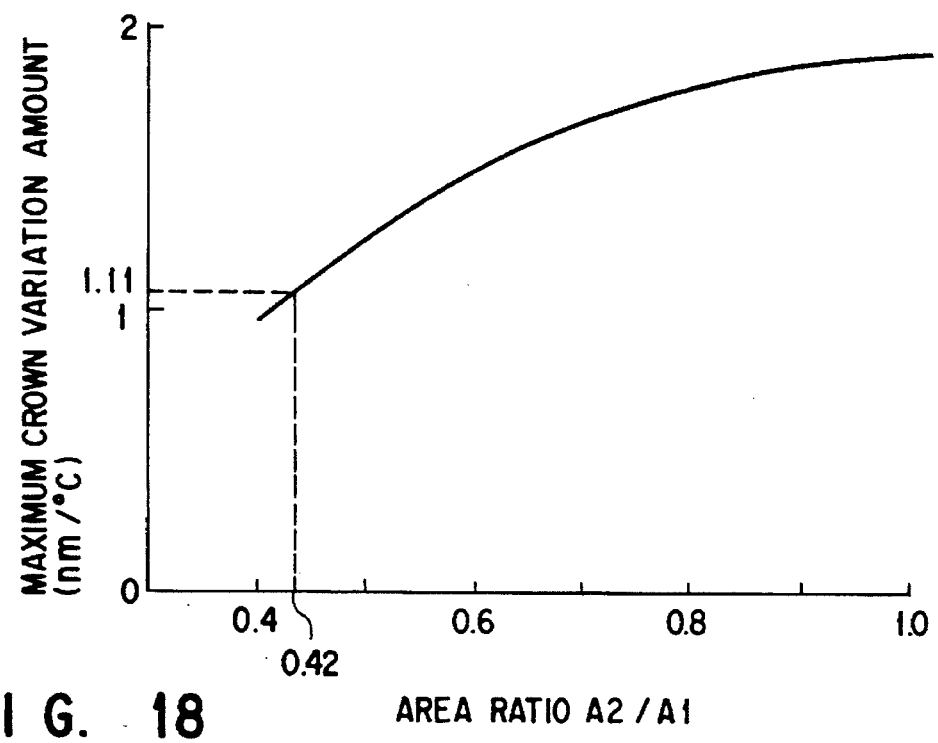
F I G. 18
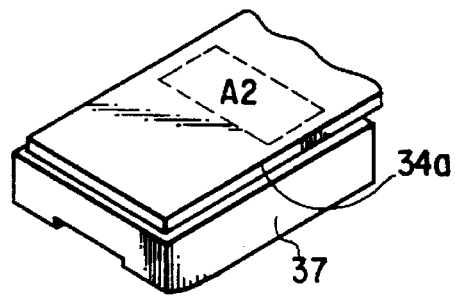
F I G. 19A
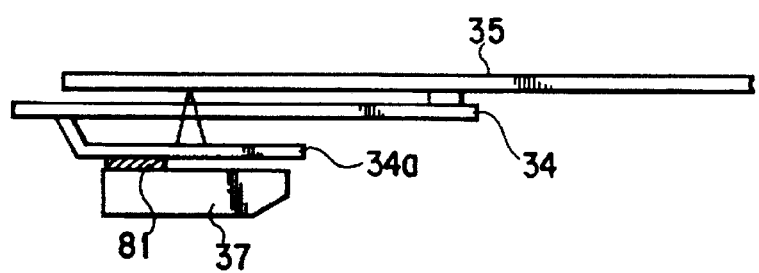
F I G. 19B

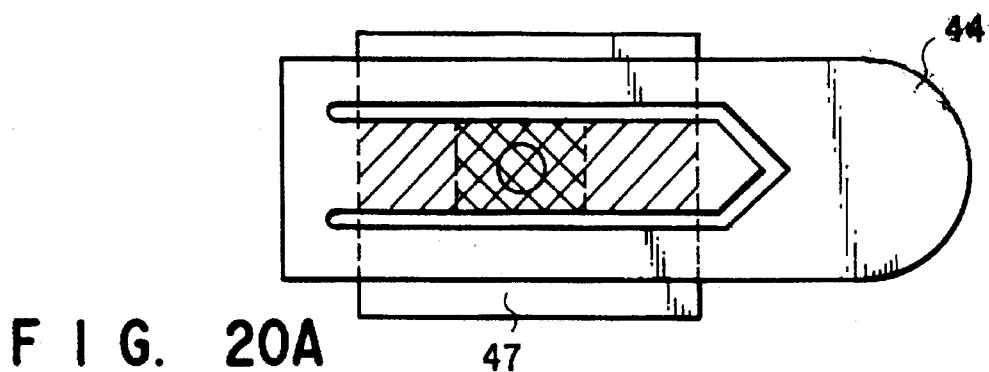
F I G. 20A
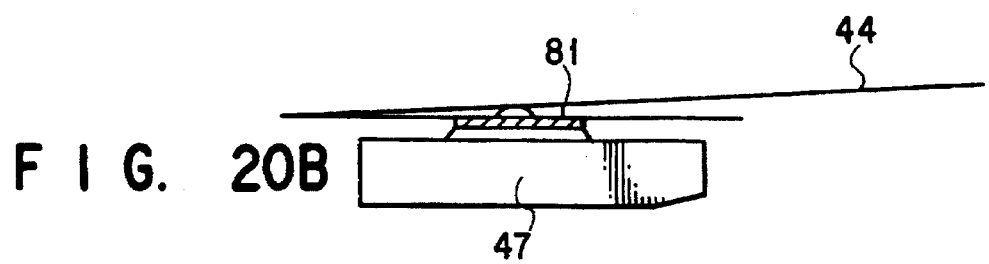
F I G. 20B
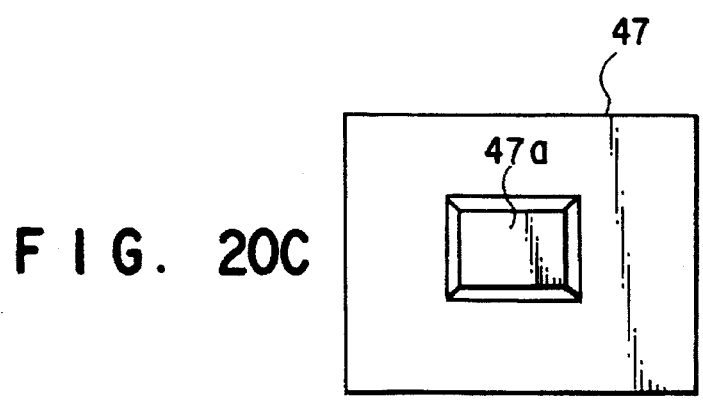
F I G. 20C
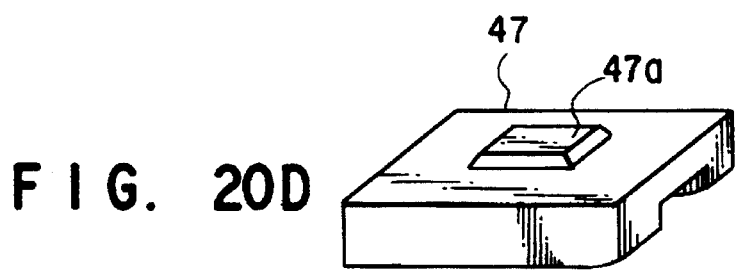
F I G. 20D

HEAD ASSEMBLY CONTROLLING DISTORTION DUE TO TEMPERATURE VARIATION AND DISK APPARATUS USING THE HEAD ASSEMBLY

BACKGROUND OF THE INVENTION

1. Field of the Invention

The present invention relates to a levitation type magnetic head assembly and a magnetic disk apparatus using the magnetic head assembly, and more particularly a magnetic head assembly having high reliability with a less variation in a crown of a magnetic head slider due to an ambient temperature variation and a magnetic disk apparatus using this magnetic head assembly.

2. Description of the Related Art

Recently, particular attention has been paid to a small-sized magnetic disk apparatus having a disk of a diameter of, e.g. 2.5 inches or less, which can be used as a data storage device for a small-sized personal computer of a lap top type or a notebook type. With this trend, there is a greater demand for a magnetic disk apparatus with a magnetic disk of a large capacity and a structure capable of withstanding the external ambience such as temperature, humidity, etc.

According to an improved method of increasing the capacity of a magnetic disk, the amount of levitation of a magnetic head slider from a disk surface is decreased, thereby increasing a linear recording density or a recording density of a disk in a circumferential direction. For example, in a currently available magnetic disk apparatus, the amount of levitation is 0.1 µm or less at normal temperature.

According to another method, the performance of a magnetic head itself is improved. Such improved-performance heads include a composite head wherein a recording/reproducing transducer of ferrite is buried in a ceramic slider of TiCaO (calcium titanate); a thin film head wherein a recording/reproducing transducer is formed on a ceramic slider of $Al_2O_3TiC$ (aluminum titanium carbide), etc. by using a thin film forming process; and a magnetoresistive thin film composite head.

In the above method of increasing the recording density by decreasing the amount of levitation of the magnetic head slider, however, there is a problem. In general, thermal expansion, etc. occur in the structural elements of a magnetic disk apparatus due to a variation in ambient temperatures. In particular, a difference in linear expansion coefficient among the structural elements (a slider member and a flexure spring) results in a change in shape of the magnetic head slider including a portion facing the disk. Such a change in shape of the magnetic head slider adversely affects the amount of levitation of the magnetic head slider while the magnetic disk apparatus is being operated. Consequently, the reliability of vibration recording/reproduction is considerably deteriorated. Specifically, if the amount of levitation of the magnetic head slider increases, a read signal amplitude in a data recording/reproducing mode lowers relatively. On the other hand, if the amount of levitation of the magnetic head slider decreases, the magnetic head slider may come into contact with a recording medium or a disk, in particular, with a projection on a disk if such a projection is provided. If the magnetic head slider comes into contact with the disk, data may be destroyed.

This problem will now be explained in greater detail with reference to a magnetic head assembly of a conventional magnetic disk apparatus.

FIG. 1 is a perspective view of a magnetic assembly applied to a conventional magnetic disk apparatus, FIG. 2A is a plan view of that side of the magnetic head assembly, which faces the disk, FIG. 2B is a side view of the magnetic head assembly, and FIG. 2C is a plan view of the opposite side of the magnetic head assembly.

A suspension 1 is fixed to a distal end portion of an arm 2 of an actuator (not shown). The suspension 1 comprises a magnetic head slider 3, a flexure spring 4, which is also called "gimbal", a load spring 5, and a mount support portion 6.

The magnetic head slider 3 is bonded to a slider fixing portion 4a of the flexure spring 4 by means of an epoxy adhesive, etc. The flexure spring 4 is provided with a slit having a U-shape in a plan view. An inner part of the flexure spring 4, surrounded by the U-shaped slit, serves as the slider fixing portion 4a. A part of the flexure spring 4 is welded to one end portion of the load spring 5 having a higher rigidity (or a greater thickness) than the flexure spring 4. The other end portion of the load spring 5 is provided with the mount support portion 6 having a higher rigidity (or a greater thickness) than the load spring 5. The entire suspension 1 is fixed to the arm 2 of the actuator via the mount support portion 6.

On the other hand, the slider fixing portion 4a of the flexure spring 4 is provided with a hemispherical projection (pivot) 4b. A top portion of the projection 4b is put in contact with the surface of the load spring 5. Thereby, the load spring 5 absorbs a levitation force of the magnetic head slider 3 due to an air bearing effect caused by a relative speed between the magnetic head slider 3 and a disk D.

The magnetic head slider 3 is bonded to the slider fixing portion 4a of the flexure spring 4 over the entire mutually contacting surfaces by an epoxy adhesive, etc. The thickness of a layer of the adhesive is set at about 20 µm or less by controlling the amount of the adhesive supplied in the manufacturing process.

FIG. 3 is a perspective view of the magnetic head slider 3. The body of the magnetic head slider 3 is made of, e.g. a ceramic material such as AlTiC. A pair of slider rails 7a and 7b are provided on that surface of the magnetic head slider 3, which faces the disk D, along an axis of symmetry of the load spring 5. In addition, those surfaces of the slider rails 7a and 7b of the magnetic head slider 3 on the air entrance side, which are opposed to the disk D, are provided with tapers 7c and 7d for levitating the magnetic head slider 3 in a sub-micron unit by the air bearing effect caused by the relative speed between the magnetic head slider 3 and the disk D. A transducer 8 for performing signal recording/reproduction is provided on the air exit side of the magnetic head slider 3. It should be noted that the magnetic head slider 3 is designed such that when the magnetic head slider 3 is levitated, a levitation amount a of the taper side of the slider 3 is always greater than a levitation amount b of the transducer side thereof, as shown in FIG. 4.

In general, a certified range of temperatures for the operation of a magnetic disk apparatus is 0° C. to 50° C. FIGS. 5A and 5B show analysis results, obtained by a structural analysis program, on the change of shape of the magnetic head slider 3 due to a difference in linear expansion coefficient between the slider material and the flexure spring material in this range of temperatures.

Suppose that a temperature for normal use of the magnetic disk apparatus is 25° C., a relative high temperature is +25° C. (50°C.), and a relative low temperature is −25° (0°C.). The length L, height H and width Ws of the magnetic head slider 3, as shown in FIGS. 2B and 2C, are set as follows:

L=2.5 mm,

H=0.5 mm, and

Ws=2.0 mm.

The thickness t and width Wf of the flexure spring 4 are set as follows:

t=0.03 mm, and

Wf=0.9 mm.

The linear expansion coefficients of the magnetic head slider 3 and flexure spring 4 are respectively set at 7.85×10−6/°C. and 17.5×10−6/°C. The magnetic head slider 3 is bonded to the slider fixing portion 4a of the flexure spring 4 over the entire mutually facing surfaces.

FIG. 5A shows the deformation state of the magnetic head slider 3 at high temperature, and FIG. 5B shows the deformation state of the same at low temperature. At high temperature, the slider rails of the magnetic head slider 3 are curved upwards, and at low temperature the slider rails are curved downwards.

FIG. 6 is a graph showing the deformation states of the slider rails of the magnetic head slider 3. The curve of the slider rail is generally called "crown." As is shown in FIG. 6, the slider rail surface deforms about 48 nm at a maximum value due to a temperature variation of ±25° C.

The cause of deformation of the magnetic head slider 3 will now be described with reference to FIG. 7. FIG. 7 illustrates a main stress acting in the magnetic head slider 3 in the longitudinal direction (i.e. the direction of extension of the slider rail) at a high relative temperature of +25°C. In FIG. 7, contour lines represent the magnitude of stress. The linear expansion coefficient of SUS 304 (JIS standard) or the material of the flexure spring 4 is 17.5×10−6/°C. , and the linear expansion coefficient of Al$_2$O$_3$TiC or the material of the magnetic head slider 3 is 7.85×10−6/°C. Accordingly, at high temperatures, the flexure spring 4 expands more than the magnetic head slider 3. A positive stress (expansion) acts on that surface of the magnetic head slider 3, which is bonded to the flexure spring 4, and a negative stress (compression) acts on the opposite-side surface. As a result, the magnetic head slider 3 deforms, as shown in FIG. 5A. At low temperatures, inversely, a negative stress (compression) acts on that surface of the magnetic head slider 3, which is bonded to the flexure spring 4, and a positive stress (expansion) acts on the opposite-side surface. As a result, the magnetic head slider 3 deforms, as shown in FIG. 5B.

The relationship between the amount of the crown and the amount of levitation will now be described with reference to FIG. 8. FIG. 8 is a graph showing the result obtained by levitation analysis on the basis of a corrected Reynolds formula, with respect to a magnetic head assembly wherein the amount of levitation of magnetic head slider 3 at normal temperature is 0.08 μm (80 nm). As has been described above, when the ambient temperature is high, the magnetic head slider 3 deforms, as shown in FIG. 5A, and the amount of levitation decreases. When the ambient temperature is low, the magnetic head slider 3 deforms, as shown in FIG. 5B, and the amount of levitation increases. Specifically, as shown in FIG. 8, if the amount of crown lowers below that at the normal temperature (i.e. at the time of high temperature), the amount of levitation decreases proportionally; and if the amount of crown increases above that at the normal temperature (i.e. at the time of low temperature), the amount of levitation increases proportionally. More specifically, the amount of levitation varies in the range of ± about 13 nm in relation to the variation of the amount of crown in the range of ±20 nm.

In this manner, the amount of crown varies in accordance with the ambient temperature, and the amount of levitation varies in accordance with the variation of the amount of crown. The prevention of the variation in the amount of crown due to the variation in ambient temperature is, therefore, an important factor in obtaining a highly reliable magnetic disk apparatus.

As has been described above, owing to the variation in the amount of levitation of the magnetic head slider 3, the magnetic head slider 3 may come into contact with, or collide with, the disk D. According to the modern disk manufacturing technology, a maximum projection height h (ground height) of the disk D is about 50 nm, as shown in FIG. 9. Supposing that the amount H of levitation of the magnetic head slider 3 is 0.08 μm (80 nm), a margin for avoiding collision is considered to be 30 nm. In order to avoid collision between the magnetic head slider 3 and disk D, it is therefore necessary to reduce to 30 nm or less the variation in the amount of levitation caused by the variation in the amount of crown due to temperature variation.

The above-described conventional magnetic head assembly, however, does not necessarily meet the above conditions, as will be explained below.

The variation a in the amount of levitation in relation to the variation in the amount of crown and the variation b in the amount of crown in relation to the temperature variation are given by:

a=0.65 nm/deg. and b=1.92 nm/deg.

If the range ±T of temperature variation is ±25 deg., the variation bT in the amount of crown is 48 nm and the variation abT in the amount of levitation is 31 nm. This indicates that in the magnetic disk apparatus using the conventional magnetic head assembly, the magnetic head assembly may possibly come into contact with the disk at high temperatures.

The amount in levitation of the magnetic head slider is influenced by a variance in quality of products, vibration, atmospheric pressure, etc. Taking these conditions into account, it is desirable that the distance between the magnetic head slider 3 and the top of the projection have an allowance of about 15% of the levitation amount H of the magnetic head slider 3, as compared to the variation amount of the levitation amount. About 15% of the levitation amount H of the magnetic head slider 3 is given by $$80 \times 0.15 = 12 \; nm.$$

Under the circumstances, there is a demand for a measure to decrease the variation (the amount of crown variation per unit temperature) of the crown amount in relation to the temperature variation. In the above example, the following condition needs to be satisfied:

$$H(80 \; nm) - h(50 \; nm) - abT \geqq 12 \; nm.$$

That is, the following condition needs to be met:

$$b \leqq 1.11 \; nm/deg.$$

When the levitation amount of the regular magnetic head slider is decreased, the influence due to the variation in crown amount is great. Thus, the temperature-dependent variation in crown amount needs to be further decreased.

SUMMARY OF THE INVENTION

The object of the present invention is to provide a magnetic head assembly wherein a crown variation amount of a magnetic head slider due to a temperature variation is reduced and a levitation variation amount is decreased, thereby enhancing the reliability of the magnetic disk apparatus and increasing a memory capacity, and to provide a magnetic disk apparatus using the magnetic head assembly.

According to a first aspect of the present invention, there is provided A levitation-type head assembly comprising: a magnetic head slider having a predetermined thickness (H) in a direction perpendicular to a surface of a recording medium; and suspension means having an adhesion portion with a thickness (t) for adhesion with the magnetic head slider, the suspension means setting an optimal variation amount of levitation amount of the magnetic head slider from the recording medium with temperature. In this head assembly, the thickness (t) of the adhesion portion of the suspension means and the thickness (H) of the magnetic head slider may have a relationship expressed by $t/H \leq 0.047$. The head assembly with this structure may be applied to a disk apparatus.

Thus, as the ratio of the thickness t of the suspension means (flexure spring) to the height H of the slider decreases, the stress acting in the slider due to a difference in linear expansion coefficient between itself and the flexure spring decreases and the rigidity of the slider increases relative to the flexure spring. By decreasing the ratio of the thickness t of the flexure spring to the height H of the slider, the maximum crown variation amount can be decreased substantially proportionally.

According to a second aspect of the invention, there is provided a levitation-type head assembly comprising: a magnetic head slider having a length (L) in a direction of movement of a recording medium and a thickness (H) in a direction perpendicular to a surface of the recording medium, the magnetic head slider being capable of having an optimal variation amount of levitation amount from the recording medium with temperature. In this head assembly, the thickness (H) of the magnetic head slider and the length (L) of the magnetic head slider may have a relationship expressed by $H/L \geq 0.245$. The head assembly with this structure may be applied to a disk apparatus.

As the dimension ratio H/L increases, the rigidity of the slider increases, and the deformation amount of the slider due to a difference in linear expansion coefficient between itself and the flexure spring decreases.

According to a third aspect of the invention, there is provided a levitation-type head assembly comprising: suspension means having a first flat surface opposed to a magnetic head slider; the magnetic head slider having a second flat surface opposed to the first flat surface of the suspension means; and adhesion means for adhering the first flat surface to the second flat surface over a predetermined adhesion area capable of providing an optimal amount of levitation of the magnetic head slider. In this head assembly, the ratio of the adhesion area (A2) between the first and second flat surfaces to the possible adhesion area (A1) therebetween may be given by $A2/A1 \leq 0.42$. The head assembly with this structure may be applied to a disk apparatus.

With the above magnetic head assembly, as with the prior art, if the ambient temperature varies, an adhesion area warps due to a difference in linear expansion coefficient between the slider and suspension means (flexure spring). However, as mentioned above, since the actual adhesion area A2 is about ½ or less of the actual adhesion area in the prior art, the variation amount (amount of warp) due to the difference in expansion amount can be relatively reduced.

Accordingly, even if the ambient temperature of the magnetic head assembly varies, the deformation of the slider can be reduced. Thus, the levitation amount of the slider, when the slider is located above the disk, can be stably maintained.

According to a fourth aspect of the invention, there is provided, a levitation-type head assembly comprising: a magnetic head slider, having a first linear expansion coefficient ($\alpha$ h), for performing data recording/reproducing; suspension means, adhered to the magnetic head slider, for supporting the magnetic head slider; and temperature compensation means provided on that surface of the magnetic head slider, which is opposite to the surface thereof adhered to the suspension means, and having a second linear expansion coefficient ($\alpha$ C) greater than the first linear expansion coefficient ($\alpha$ h). In this head assembly, the suspension means has a third linear expansion coefficient ($\alpha$ 1), and the third linear expansion coefficient ($\alpha$ 1) and the second linear expansion coefficient ($\alpha$ C) may have a relationship expressed by $0.5 \leq \alpha\, C/\alpha\, 1 \leq 2.0$.

In the above magnetic head assembly, a warp occurs in the adhesion area between the suspension means (flexure spring) and slider in accordance with a variation in ambient temperature. Similarly, a warp occurs in the adhesion area between the temperature compensation means (member) and slider. Thus, stresses acting in opposite directions occur in the upper and lower adhesion areas of the slider, and, as a result, these stresses cancel each other. Therefore, deformation of the slider can be prevented.

According to a fifth aspect of the invention, there is provided a levitation-type head assembly comprising: a magnetic head slider for performing data recording/reproducing; suspension means, adhered to the magnetic head slider, for supporting the magnetic head slider, the suspension means having a first linear expansion coefficient ($\alpha$ S); and temperature compensation means provided on that surface of the suspension means, which is opposite to the surface thereof adhered to the magnetic head slider, and having a second linear expansion coefficient ($\alpha$ t) greater than the first linear expansion coefficient ($\alpha$ S). In this head assembly, the magnetic head slider has a third linear expansion coefficient ($\alpha$ h), and the third linear expansion coefficient ($\alpha$ h) and the second linear expansion coefficient ($\alpha$ t) may have a relationship expressed by $0.5 \leq \alpha\, t/\alpha\, h \leq 2.0$.

Since the temperature compensation (means) member having a lower linear expansion coefficient than the suspension means (flexure spring) is used, part of a stress caused by a difference in linear expansion coefficient between the flexure spring and slider can be canceled by a stress caused by a difference in linear expansion coefficient between the flexure spring and temperature compensation member. Thus, the deformation amount variation of the slider rail surface can be reduced.

According to each aspect of the invention as described above, the maximum crown variation amount per unit temperature can be reduced to 11 nm/deg. or less, i.e. about half the maximum crown variation amount in the prior art. Thus, there is no concern that the slider comes into contact with the disk in the temperature range of the magnetic disk apparatus (0° C. to 50°C.). Moreover, since the levitation amount of the slider can be more stabilized in relation to the temperature variation, the reliability of recording/reproducing signals on the disk can be remarkably enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A to 2C are views for describing the magnetic head assembly as shown in FIG. 1, in which FIG. 2A is a plan view of that side of the magnetic head assembly, which faces the disk, FIG. 2B is a side view, and FIG. 2C is a plan view of the opposite side of the magnetic head assembly as shown in FIG. 2A;

FIG. 3 is a perspective view of the magnetic head slider of a magnetic head assembly as shown in FIG. 1;

FIG. 4 shows an attitude of the magnetic head slider shown in FIG. 3 at the time of levitation;

FIGS. 5A and 5B show deformed states of the magnetic head slider as shown in FIG. 3, in which FIG. 5A shows a deformed state of the magnetic head slider at high temperatures, and FIG. 5B shows a deformed state of the magnetic head slider at low temperatures;

FIG. 10 shows the entire structure of a magnetic disk apparatus according to an embodiment of the present invention;

FIG. 11 is a graph showing deformation amounts of slider rail surfaces at a high temperature (50°C.) and at low temperatures (0°C.) of both the magnetic head assembly according to the first embodiment of the present invention, wherein SUS420 (linear expansion coefficient: $10.0\times10^{-6}$/°C.) is used as flexure spring material and $Al_2O_3TiC$ (aluminum titanium carbide: linear expansion coefficient: $7.85\times10^{-6}$/°C.) is used as slider material, and a conventional magnetic head assembly wherein SUS304 is used as flexure material;

FIG. 12 is a graph showing the relationship between a difference ($\alpha b - \alpha h$) in linear expansion coefficient between the slider material and flexure spring material of the magnetic head assembly of the first embodiment, and the amount of maximum crown variation per unit temperature;

FIG. 13 is a perspective view of a magnetic head assembly according to a second embodiment of the present invention;

FIG. 14 is a graph showing the relationship between a dimensional ratio (t/H) and a maximum crown amount per unit temperature in the magnetic head assembly as shown in FIG. 13;

FIG. 15 is a perspective view showing a magnetic head assembly according to a third embodiment of the invention;

FIGS. 17A and 17B show a magnetic head assembly according to a fourth embodiment of the invention, in which FIG. 17A is a plan view of the magnetic head assembly and FIG. 17B is a side view of the same;

FIG. 18 is a graph showing the relationship between a ratio (A2/A1) of an actual adhesion area to a possible adhesion area and a maximum crown amount per unit temperature in the magnetic head assembly as shown in FIGS. 17A and 17B;

FIGS. 19A and 19B show a modification of the fourth embodiment, in which FIG. 19A is a perspective view of the magnetic head assembly and FIG. 19B is a side view of the same;

FIGS. 20A to 20D are views for describing a magnetic head assembly according to a fifth embodiment of the invention, in which FIG. 20A is a plan view showing an adhesion area of the slider and flexure spring, FIG. 20B is a side view of the magnetic head assembly, FIG. 20C is a plan view of the slider of the magnetic head assembly and FIG. 20D is a perspective view of the slider shown in FIG. 20C;

FIGS. 21A and 21B are views for describing a magnetic head assembly according to a sixth embodiment of the invention, in which FIG. 21A is a perspective view of the magnetic head assembly and FIG. 21B is a side view of the same;

FIGS. 24A and 24B are views for describing a third modification of the sixth embodiment, in which FIG. 24A is a plan view showing an adhesion area of the slider and flexure spring, and FIG. 24B is a side view showing the adhesion area of the slider and flexure spring;

FIGS. 26A to 26C show a magnetic head assembly according to a seventh embodiment of the invention, in which FIG. 26A is a perspective view of that side of the magnetic head assembly, which faces the disk, FIG. 26B is a perspective view showing the opposite side of the magnetic head assembly, and FIG. 26C is a cross-sectional view taken along line A—A' in FIG. 26B;

DETAILED DESCRIPTION OF THE PREFERRED EMBODIMENTS

Figure 1:
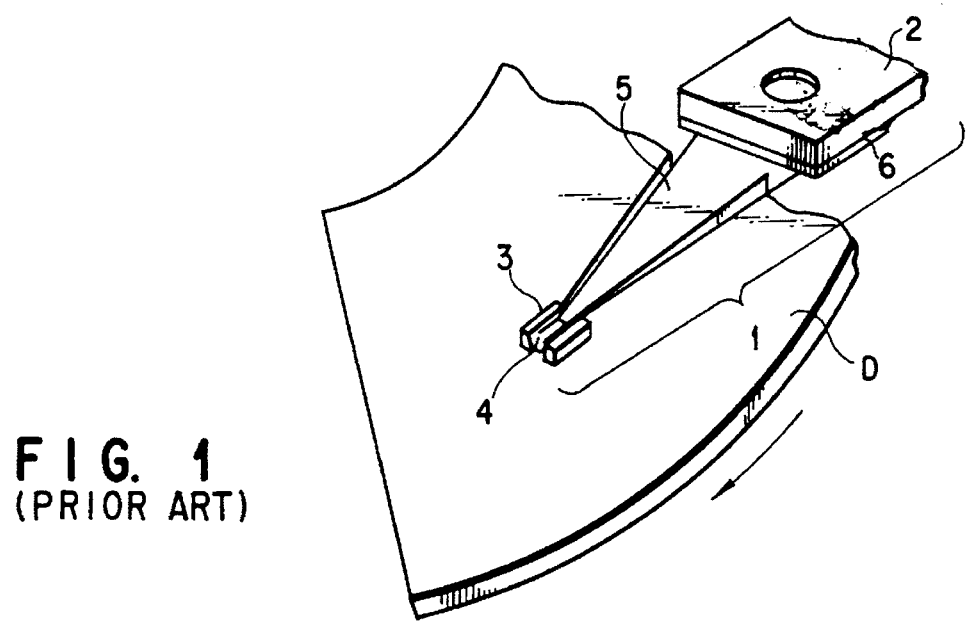
FIG. 1 is a perspective view of a conventional magnetic head assembly.
Figure 2A:
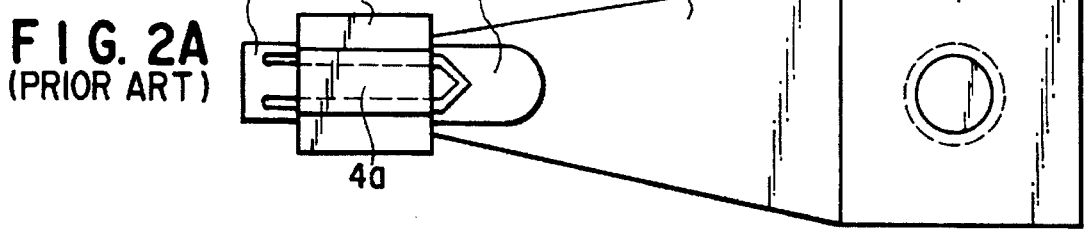
Figure 2B:
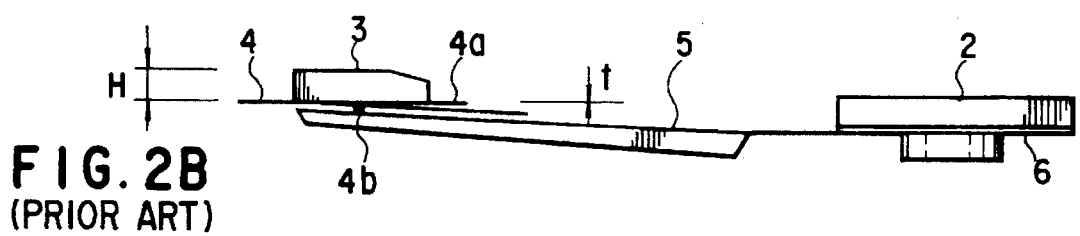
Figure 2C:
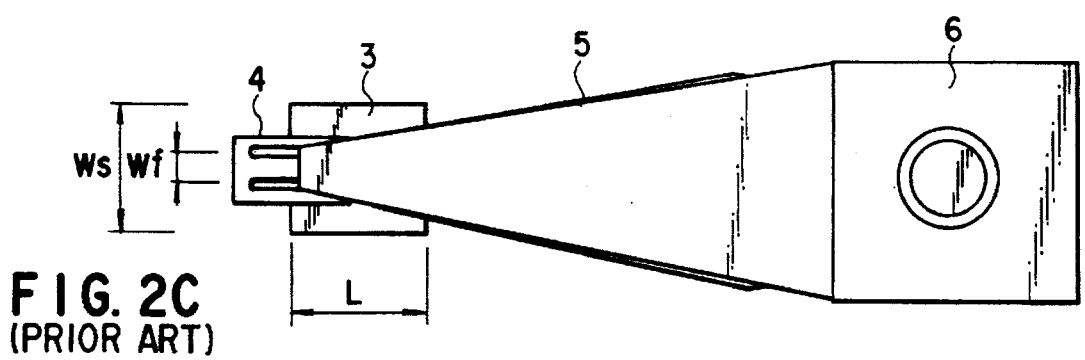
Figure 6:
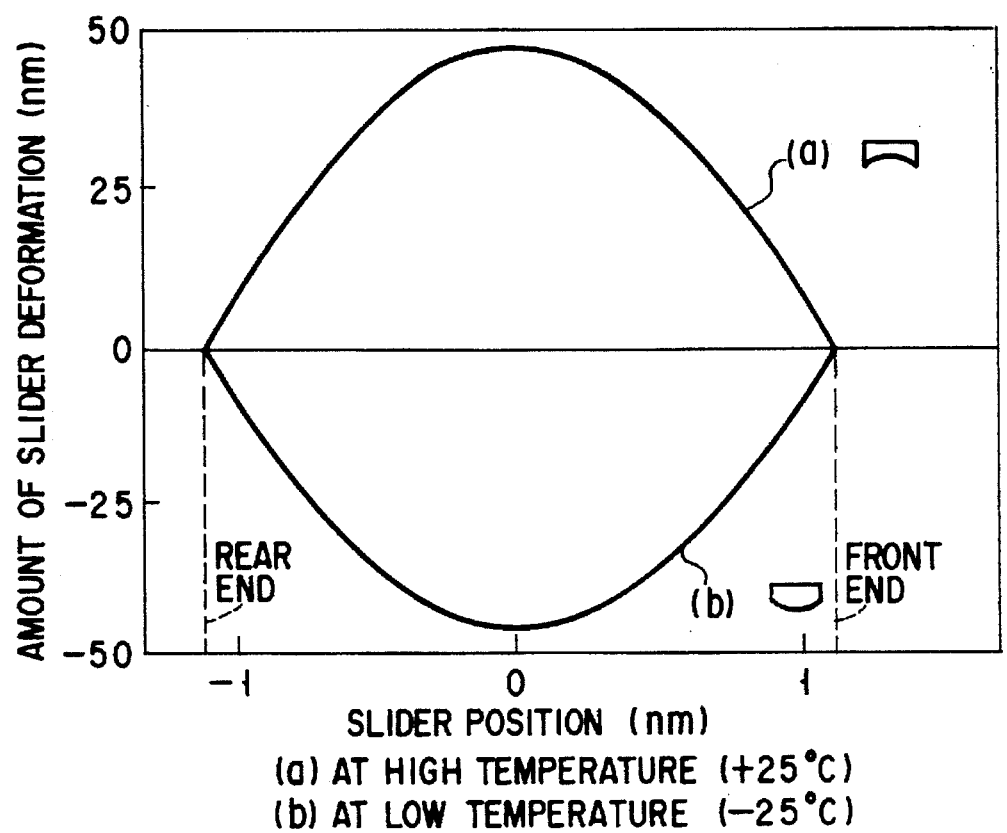
FIG. 6 is a graph showing amounts of deformation of slider rails at high temperatures and low temperatures of the magnetic head slider as shown in FIG. 3.
Figure 7:
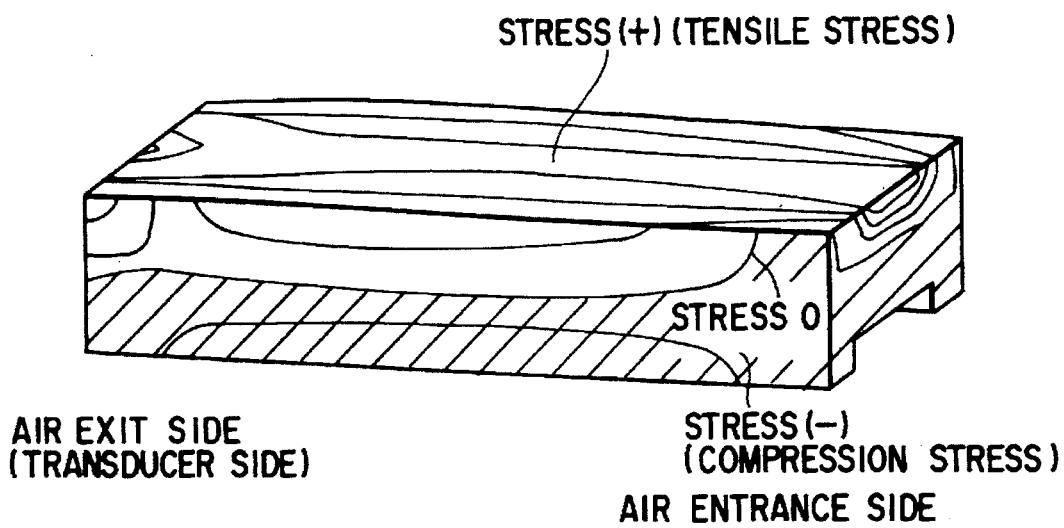
FIG. 7 shows a distribution of a main stress acting in the magnetic head slider shown in FIG. 3 in the longitudinal direction thereof at high temperatures.
Figure 8:
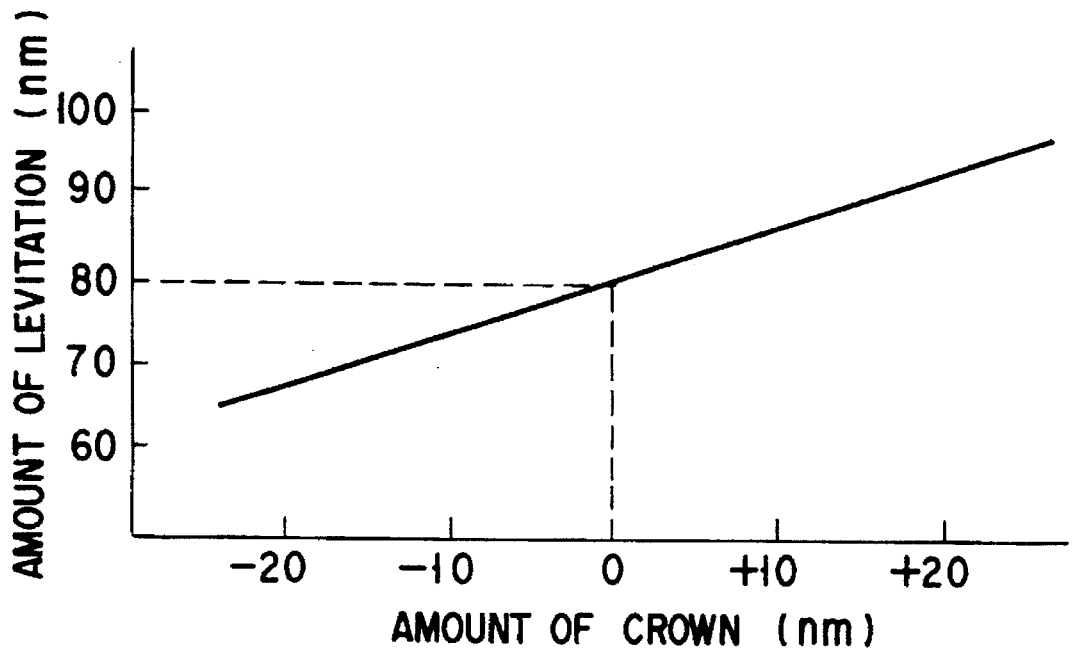
FIG. 8 is a graph showing the relationship between the crown amount and levitation amount of the magnetic head slider as shown in FIG. 3.
Figure 9:
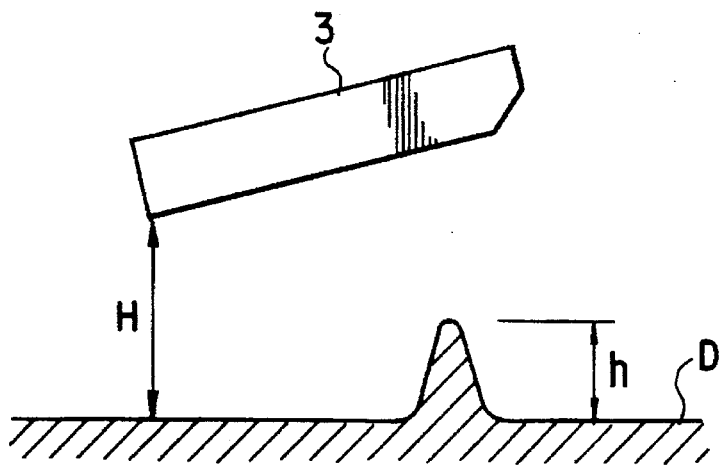
FIG. 9 illustrates the positional relationship between the magnetic head slider shown in FIG. 3, which is levitated, and a projection on the disk surface.

Various embodiments of the present invention will now be described with reference to the accompanying drawings.

FIG. 10 is a perspective view showing the entire structure of a magnetic disk apparatus according to the present invention.

As is shown in FIG. 10, the magnetic disk apparatus has a rectangular frame 11 with a top opening. The top opening of the frame 11 is closed by a top cover 13 with a packing 12 interposed. The top cover 13 is fixed to the frame 11 by a plurality of screws 13a. It is desirable that the frame 11 and top cover 13 be formed of a rigid iron-based material. The dimensions of the entire apparatus are: width=70 mm; length=100 mm; and height 19 mm.

The frame 11 contains a plurality of magnetic disks 15, a disk driving mechanism 16 for rotating each magnetic disk 15, and a plurality of magnetic head assemblies 31. The magnetic head assemblies 31 are supported in parallel so that both surfaces of each magnetic disk 15 can be accessed. The frame 11 further contains a carriage assemblies 18 for rotating the magnetic head assemblies 31 in the radial direction of the magnetic disks 15, a voice coil motor 19 for driving the carriage assemblies 18 and a preamplifier 20. A printed board 21 having electronic parts such as a microcomputer and a memory for controlling the entire magnetic disk apparatus is attached to a bottom surface of the frame 11 by means of screws.

Each magnetic disk 15 comprises a disk-shaped glass substrate having a center hole, and magnetic layers formed on both surfaces of the glass substrate. The diameter of the magnetic disk 15 is 65 mm (2.5 inches). The magnetic disks 15 are coaxially engaged on a hub 22 of a spindle motor (not shown) serving as a driving source of the disk driving mechanism 16. The magnetic disks 15 are stacked along the axis of the hub 22 at predetermined intervals. A fixing ring 23 is attached to a top portion of the hub 22 by means of screws. The magnetic disks 15 are clamped between the fixing ring 23 and a flange (not shown) provided at a lower end portion of the hub 22. The magnetic disks 15 are rotated by the spindle motor at a speed of 4200 rpm. On the other hand, the carriage 18 comprises a cylindrical carriage base 25 rotatably supported on the frame 11, and a plurality of arms 26 extending from the carriage base 25 towards the magnetic disks 15 in parallel to one another. Of the arms 26, the uppermost arm and lowermost arm are each provided with one magnetic head assembly 31. Each of the other intervening arms is provided with a pair of magnetic head assemblies 31.

Embodiments of the magnetic head assembly 31 applied to the above magnetic disk apparatus will now be described. The basis structure of the magnetic head assembly according to each embodiment is the same as that of the magnetic head assembly as shown in FIGS. 2A to 2C and FIG. 3, and therefore a detailed description thereof is omitted.

<First Embodiment>

In a magnetic head assembly according to a first embodiment of the invention, a slider material and a flexure spring material are selected so that a difference ($\alpha$ S–$\alpha$ b) in linear expansion coefficient between the slider material and the flexure spring material may become $5.3 \times 10^{-6}/°C$. or less, thereby to reduce the amount of deformation of slider rails due to a temperature variation, i.e. the amount of crown. For example, if $Al_2O_3TiC$ (aluminum titanium carbide: linear expansion coefficient $\alpha$ h=$7.85 \times 10^{-6}/°C$.) is selected as slider material, SUS 420 (linear expansion coefficient $\alpha$ S=$10.0 \times 10^{-6}/°C$.) is used as flexure spring material in place of conventionally used SUS304 (linear expansion coefficient=$17.5 \times 10^{-6}/°C$.).

FIG. 11 is a graph in which the amount of deformation of slider rail surfaces at a high temperature (50°°C.) and a low temperature (0° C.), in the case where SUS420 is used as flexure spring material, is compared to the amount of deformation in the case of the prior art. From the graph, it is understood that the amount of deformation of slider rail surfaces can be reduced to about ⅓ or less of the amount of deformation in the prior art, by using SUS420 as flexure spring material, which is not so different in linear expansion coefficient from the slider material.

FIG. 12 is a graph showing the relationship between a difference ($\alpha$ S–$\alpha$ h) in linear expansion coefficient between the slider material and flexure spring material, and the amount of maximum crown variation per unit temperature. In FIG. 12, a circular mark indicates a value relating to the above-described conventional magnetic head assembly (SUS304 is used as flexure spring material). As shown in this graph, the difference ($\alpha$ 1–$\alpha$ 2) in linear expansion coefficient is substantially proportional to the amount of maximum crown variation per unit temperature. Moreover, it is understood, from this graph, that the maximum crown variation amount per unit can be reduced to 1.11 nm/deg. or less by reducing the difference in linear expansion coefficient to $5.3 \times 10^{-6}/°C$. or less. If the maximum crown variation amount is reduced to 1.11 nm/deg. or less, the aforementioned problem due to the variation in the amount of levitation caused by the variation in the crown amount does hardly occur in widely used magnetic disk apparatuses. This value (1.11 nm/deg.) is calculated on the basis of various data relating to various magnetic disk apparatuses (see page 8 line 6 - page 11 line 10).

A titanium alloy material is another example of flexure spring material which can meet the condition of the difference in linear expansion coefficient.

<Second Embodiment>

A magnetic head assembly according to a second embodiment of the present invention will now be described with reference to the accompanying drawings. In the second embodiment, as shown in FIG. 13, the dimension ratio t/H of the thickness t of the flexure spring 14 to the height (thickness) H of the slider 17 is set at 0.047 or less in order to reduce the variation in crown amount due to a variation in temperature.

FIG. 14 is a graph showing the relationship between the dimension ratio t/H and the maximum crown variation amount. A circular mark in the graph indicates the position of the conventional magnetic head assembly. As the ratio of the thickness t of the flexure spring 14 to the height H of the slider 17 decreases, the stress acting in the slider 17 due to a difference in linear expansion coefficient between itself and the flexure spring 14 decreases and the rigidity of the slider 17 increases relative to the flexure spring 14. Thereby, as shown in FIG. 14, by decreasing the ratio of the thickness t of the flexure spring 14 to the height H of the slider 17, the maximum crown variation amount can be decreased substantially proportionally. Moreover, it is understood, from the graph, that the maximum variation amount per unit temperature can be reduced to 1.11 nm/deg. or less by reducing the aforementioned dimension ratio t/H to 0.047 or less.

<Third Embodiment>

A magnetic head assembly according to a third embodiment of the present invention will now be described with reference to the accompanying drawings. In the third embodiment, as shown in FIG. 15, the dimension ratio H/L of the height H of a slider 27 to the length L thereof is set at 0.245 or more in order to reduce the variation in crown amount due to a variation in temperature.

Figure 16:
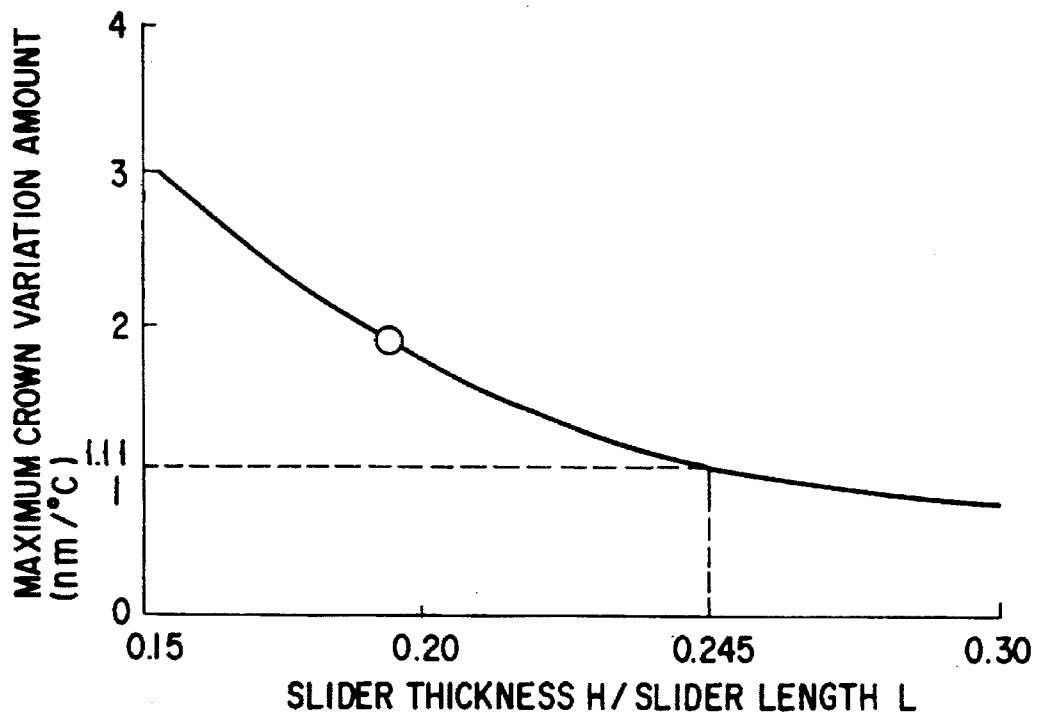
FIG. 16 is a graph showing the relationship between a dimensional ratio (H/L) and a maximum crown amount per unit temperature in the magnetic head assembly as shown in FIG. 15.

FIG. 16 is a graph showing the relationship between the dimension ratio H/L and the aforementioned maximum crown variation amount. In the graph, a circular mark indicates the position of the conventional magnetic head assembly. As is shown in the graph, the dimension ratio H/L is substantially inversely proportionate to the maximum crown variation amount. Specifically, as the dimension ratio H/L increases, the rigidity of the slider 27 increases and the deformation amount of the slider 27 due to a difference in linear expansion coefficient between itself and a flexure spring 24 decreases. Moreover, it is understood, from the graph, that the maximum variation amount per unit temperature can be reduced to 1.11 nm/deg. or less by reducing the aforementioned dimension ratio H/L to 0.245 or less.

<Fourth Embodiment>

Figure 17A:
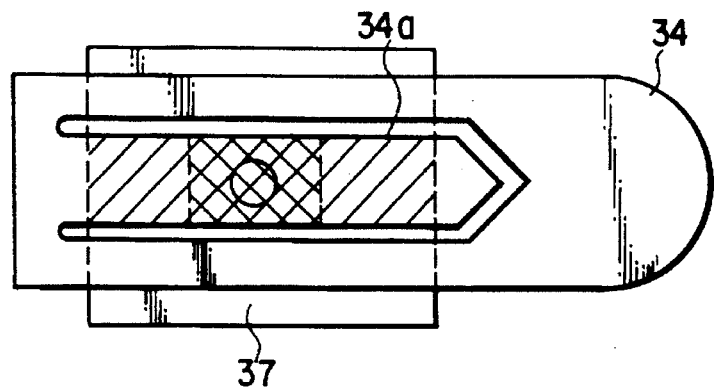
Figure 17B:
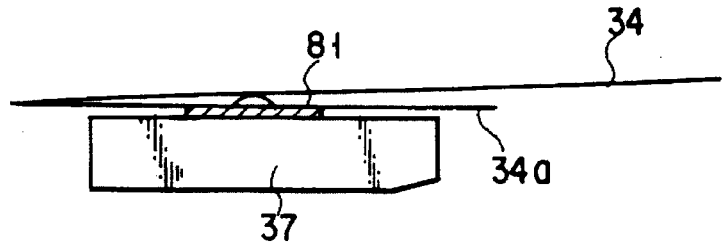

A magnetic head assembly according to a fourth embodiment of the invention will now be described with reference to the accompanying drawings. In this embodiment, as shown in FIGS. 17A and 17B, in order to reduce the crown amount variation due to a temperature variation, the ratio A2/A1 of an actual adhesion area A2 (indicated by double hatching) between a slider 37 and a slider fixing portion 34a of a flexure spring 34 to a possible adhesion area A1 (indicated by hatching) therebetween is reduced to 0.42 or less. In FIG. 17B, reference numeral 81 denotes an adhesive for adhesion between the slider 37 and the slider fixing portion 34a of flexure spring 34.

FIG. 18 is a graph showing the relationship between the aforementioned area ratio A2/A1 and the maximum crown variation amount. If the area ratio A2/A1 is decreased, the stress acting in the slider 37 due to a difference in linear expansion coefficient between itself and the flexure spring 34 decreases and, as shown in the graph, the maximum crown variation amount decreases. Moreover, it is understood, from the graph, that the maximum variation amount per unit temperature can be reduced to 1.11 nm/deg. or less by reducing the aforementioned area ratio A2/A1 to 0.42 or less.

A modification of the fourth embodiment will now be described with reference to FIGS. 19A and 19B. In this modification, an actual adhesion area A2 is encircled by a broken line in FIG. 19A. The actual adhesion area is about ½ (A2/A1=0.5) of a conventional adhesion area. The actual adhesion area is located on the air exit side of the slider 37, i.e. on the transducer side. In other words, the non-adhesion area between the slider 37 and flexure spring 34 is set at about ½ or more of the possible adhesion area. FIG. 19A is a perspective view showing an adhesion state between the slider 37 and flexure spring 34, and FIG. 19B is a side view showing the same.

With the above magnetic head assembly, as with the prior art, if the ambient temperature varies, an adhesion area warps due to a difference in linear expansion coefficient between the slider 37 and flexure spring 34. However, as mentioned above, since the actual adhesion area A2 is about ½ or less of the actual adhesion area in the prior art, the variation amount (amount of warp) due to the difference in expansion amount can be relatively reduced. Accordingly, even if the ambient temperature of the magnetic head assembly varies, the deformation of the slider 37 can be reduced. Thus, the levitation amount of the slider 37, when the slider 37 is located above the disk, can be stably maintained.

In this modification, the adhesion area is provided on the air exit side of the slider 37, i.e. on the transducer side. The location of the adhesion area, however, is not limited to this, and it may be located on the air entrance side, i.e. on the taper side. Furthermore, the actual adhesion area may be provided so as to meet the aforementioned condition. Specifically, the magnetic head assembly may be constituted so that the ratio A2/A1 of the actual adhesion area A2 (indicated by double hatching) to the entire possible adhesion area A1 (indicated by hatching) is set at 0.42 or less.

<Fifth Embodiment>

A magnetic head assembly according to a fifth embodiment of the invention will now be described with reference to FIGS. 20A to 20D. FIG. 20A is a plan view showing an adhesion area between a slider 47 and a flexure spring 44, FIG. 20B is a side view showing the same, FIG. 20C is a plan view showing the slider 47 alone separately, and FIG. 20D is a perspective view of the slider 47.

As is shown in the figures, in the fifth embodiment, a projection 47a for defining an adhesion area between the slider 47 and flexure 44 is provided on that surface of the slider 47 which is to be adhered to the flexure spring 44. The surface of the projection 47a is flat. The slider 47 and flexure 44 are adhered to each other by an adhesive 81 at the projection 47a. Accordingly, the same advantage as with the fourth embodiment can be obtained by setting the surface area of the projection 47a within the range of the adhesion area A2 which meets the condition of the area ratio in the fourth embodiment:

A2 (actual adhesion area)/A2 (possible adhesion area) ≦0.42

In addition, in the fifth embodiment, since the projection 47a is provided, a small adhesion area can be exactly limited to the area of the projection 47a. Therefore, an increase or decrease in adhesion area due to erroneous adhesion can be prevented.

<Sixth Embodiment>

Figure 21A:
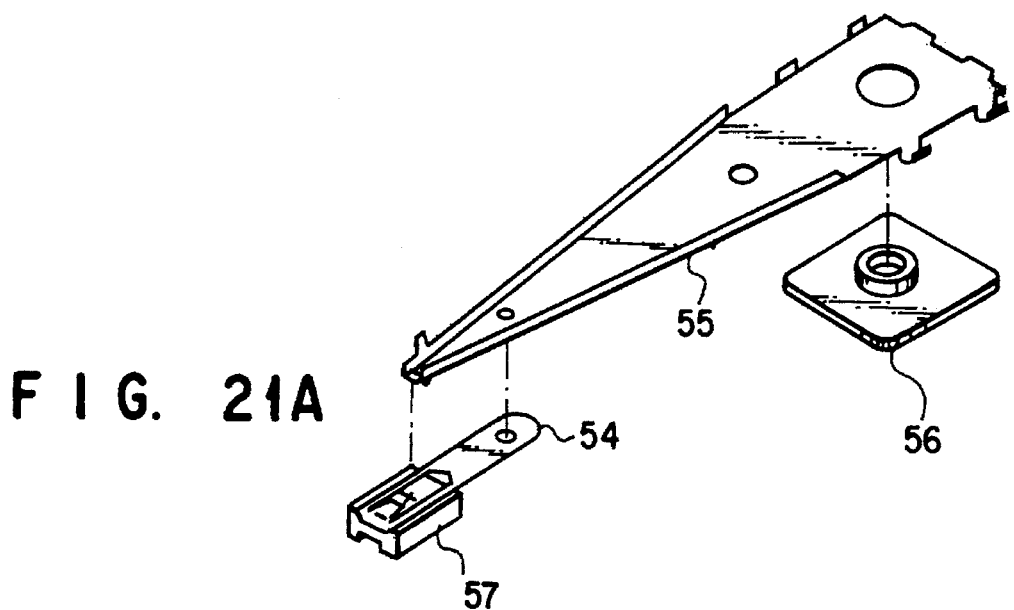
Figure 21B:
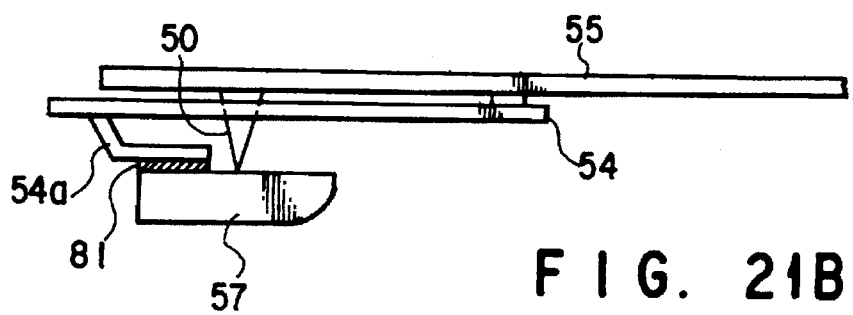

A sixth embodiment of the invention will now be described with reference to FIGS. 21A to 25C. In the sixth embodiment, the shape of a flexure spring 54 is changed in order to reduce an adhesion area between a slider 57 and a flexure spring 54. Specifically, the size of a slider fixing portion 54a of flexure spring 54 is varied so that the actual adhesion area may become, e.g. about ½ of the adhesion area in the prior art, or the condition in the fourth embodiment may be satisfied. In this structure, as with the prior art, a pivot 50 for applying a load of the load spring member 55 to the slider 57 cannot be provided on a part of the flexure spring 54. Thus, in the present embodiment, as shown in FIG. 21B, the slider fixing portion 54a or a part of the flexure spring 54 is reduced in size, and the pivot 50 is provided on the load spring 55. The other structural features are common to those as described above, and a description thereof is omitted.

Figure 22:
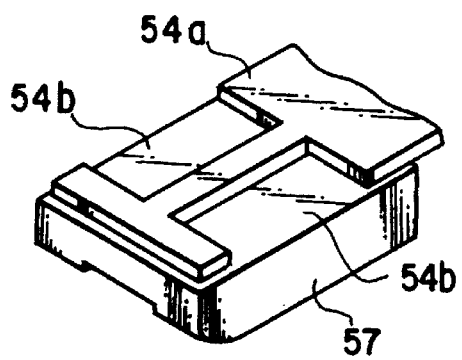
FIG. 22 is a perspective view showing a first modification of the sixth embodiment, and in particular an adhesion area of the slider and flexure spring.

FIG. 22 shows a first modification of the sixth embodiment. In the first modification, the slider fixing portion 54a of the flexure spring 54 is provided with a plurality of notches 54b in order to make the adhesion area between the slider 57 and the slider fixing portion 54a of flexure spring 54 less than in the prior art.

In this case, the slider fixing portion 54a may be provided with a space for provision of a pivot. In addition, as with the preceding embodiment, the pivot 50 may be provided on the load spring 55.

Figure 23:
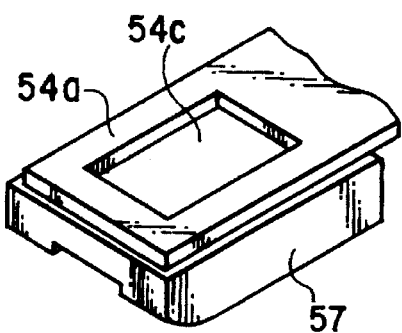
FIG. 23 is a perspective view showing a second modification of the sixth embodiment, and in particular an adhesion area of the slider and flexure spring.

FIG. 23 shows a second modification of the sixth embodiment. In the second modification, a hole 54c is formed at a center of the slider fixing portion 54a in order to reduce the adhesion area between the slider 57 and the slider fixing portion 54a of flexure spring 54. In this case, as with the preceding embodiment, the pivot 50 is provided on the load spring 55.

Figure 24A:
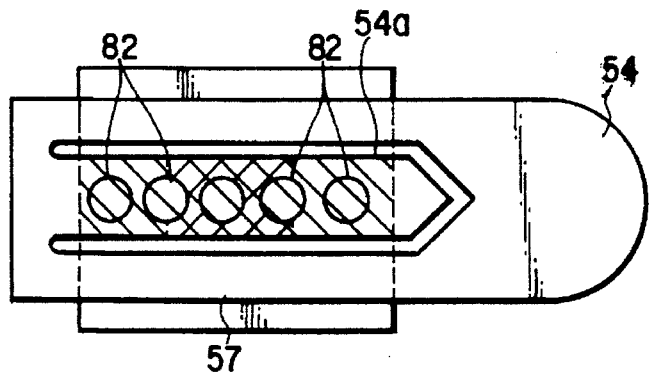
Figure 24B:
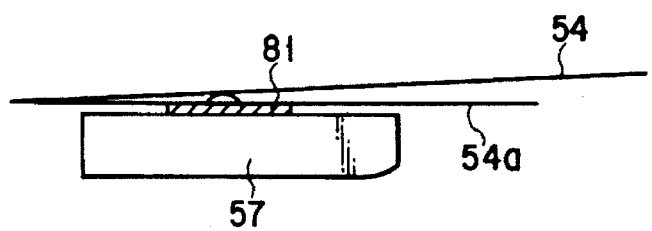

A third modification of the sixth embodiment will now be described with reference to FIGS. 24A and 24B. FIG. 24A is a plan view showing an adhesion area between the slider 57 and flexure spring 54, and FIG. 24B is a side view showing the same. As shown in these figures, in the third modification, the slider fixing portion 54a of flexure spring 54 is provided with a plurality of holes 82 at predetermined intervals by means of etching, etc. By forming the holes 82, the actual adhesion area A2 between the slider 37 and flexure spring 34 is reduced. Thus, the same advantage as with the fourth embodiment can be obtained.

Figure 25A:
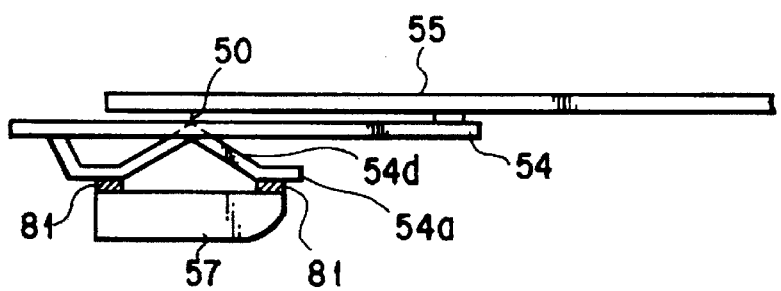
FIGS. 25A to 25C are views for describing other modifications of the sixth embodiment, each figure showing a pattern of a bent portion provided at a center region of a slider fixing portion.
Figure 25B:
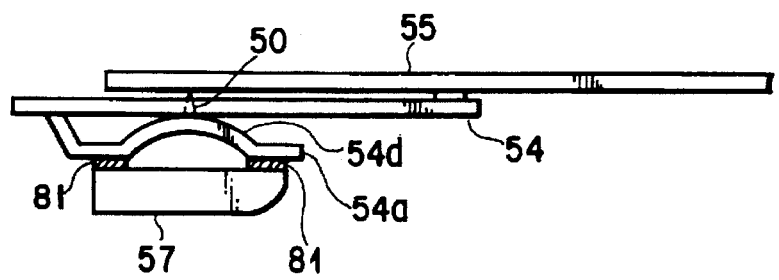
Figure 25C:
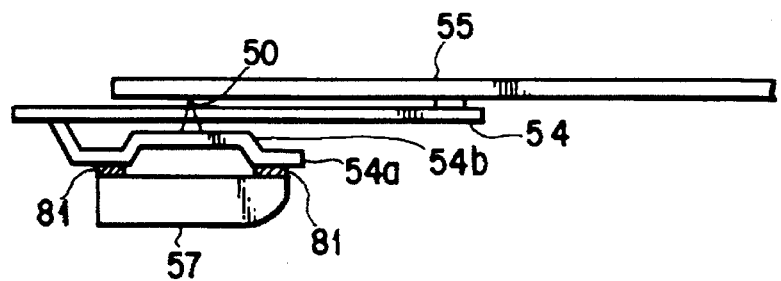

Further modifications will now be described with reference to FIGS. 25A to 25C. In these modifications, bent portions 54d are formed at center portions of slider fixing portions 54a of flexure springs 54 attached to the sliders 57. With this structure, two adhesion areas are provided between the slider 57 and flexure spring 54. As is shown in FIGS. 25A to 25C, the bent portion 54d is formed such that it does not come into contact with a center area of a flat portion of the slider 57. The pivot 50 is provided on a substantially center area of the bent portion 54d.

With this structure, the actual adhesion area between the slider 57 and slider fixing portion 54a can be reduced. Accordingly, even if the ambient temperature varies, the amount of deformation of the slider 57 due to a warp of the adhesion area can be reduced. Moreover, in the modification as shown in FIGS. 25A to 25C, a warp occurring in the adhesion area can be absorbed by the bent portion 54d, and the amount of deformation of the slider 57 can be reduced.

<Seventh Embodiment>

Figure 26A:
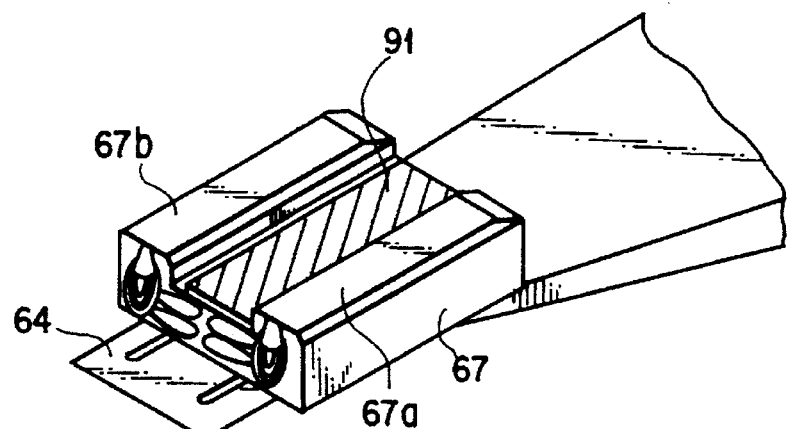
Figure 26B:
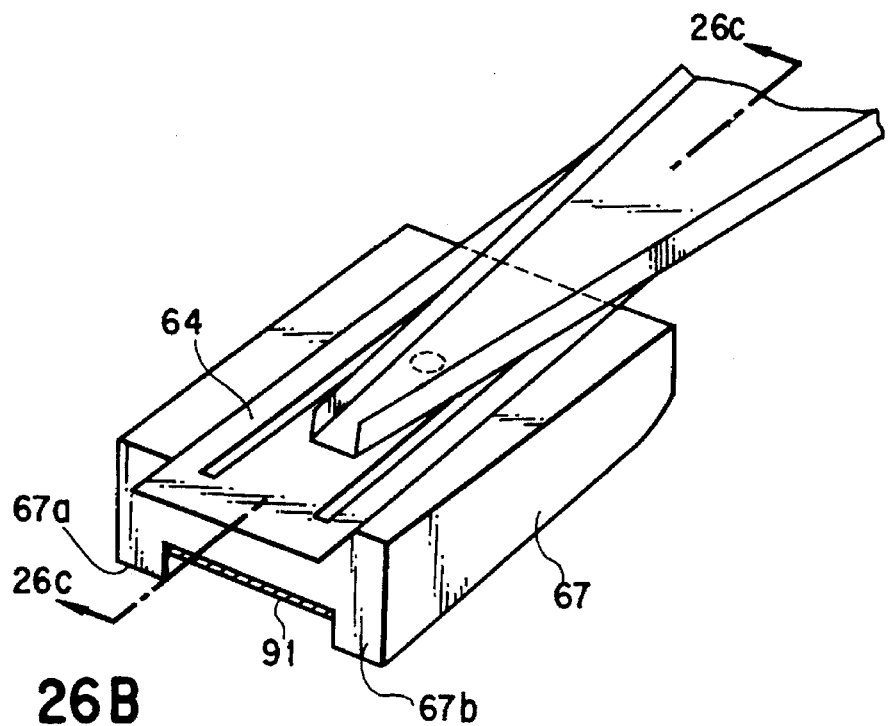
Figure 26C:
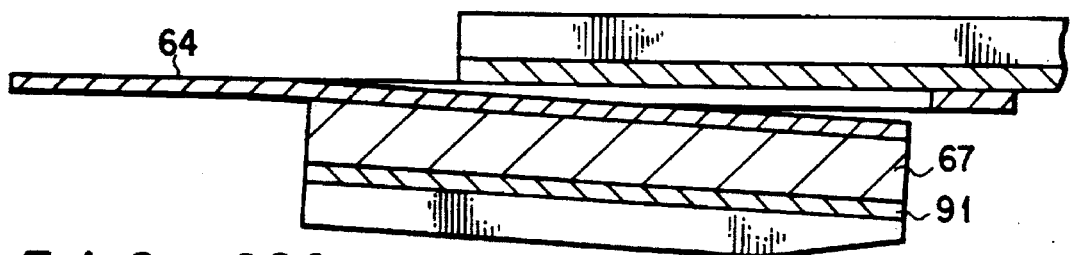

A seventh embodiment of the invention will now be described with reference to the accompanying drawings. In the seventh embodiment, as shown in FIGS. 26A to 26C, a temperature compensation member 91 is attached to a recess defined between slider rails 67a and 67b formed on that surface of the slider 67, which faces the disk. FIG. 26A is a perspective view showing the disk-facing side of the magnetic head assembly of the seventh embodiment, FIG. 28B is a perspective view showing the opposite side of the magnetic head assembly, and FIG. 26C is a cross-sectional view taken along line 26C in FIG. 26B. It is desirable that the temperature compensation member 91 be formed of a material with a linear expansion coefficient close or equal to that of the flexure spring 64. The temperature compensation member 91, however, should be formed of a material with a linear expansion coefficient greater than at least that of the slider 67.

It is desirable that the linear expansion coefficient $\alpha C$ of the temperature compensation member 91 be determined to meet the following condition:

$$0.5 \leq \alpha C / \alpha S \leq 2.0$$

where $\alpha S$ is the linear expansion coefficient of flexure spring 64.

The temperature compensation member 91 is adhered to the slider 67 by using the adhesive used for adhering the slider 67 to the flexure spring 64, or by using other means capable of providing an adhesion strength substantially equal to that of this adhesive. The temperature compensation member 91 may be formed directly by using sputtering, plating, etc.

In the above magnetic head assembly, a warp occurs in the adhesion area between the flexure spring 64 and slider 67 in accordance with a variation in ambient temperature. Similarly, a warp occurs in the adhesion area between the temperature compensation member 91 and slider 67. Thus, stresses acting in opposite directions occur in the upper and lower adhesion areas of the slider 67, and, as a result, these stresses cancel each other. Therefore, deformation of the slider 67 can be prevented.

Figure 27:
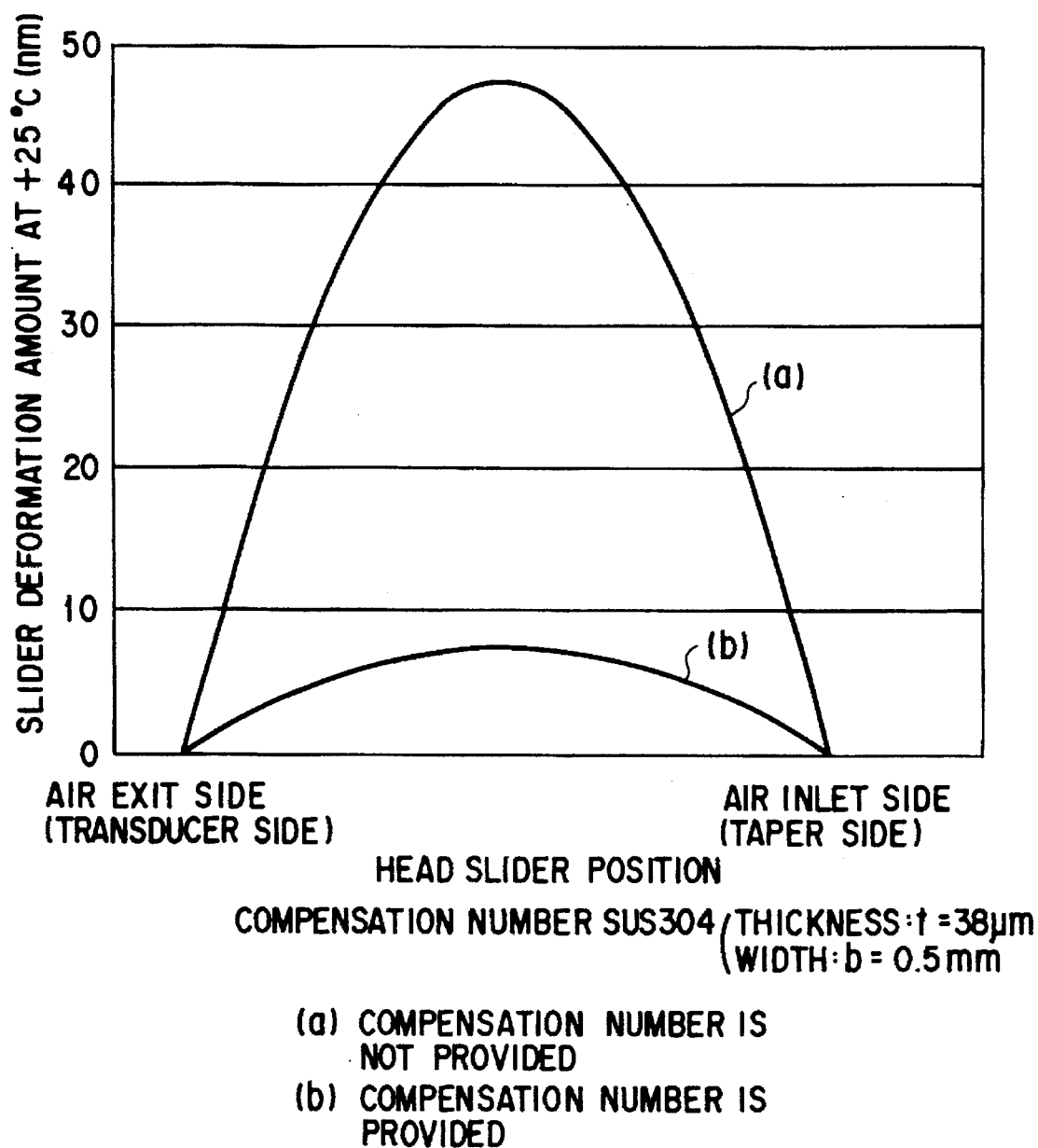
FIG. 27 is a graph showing variations in the amount of deformation of slider rail surfaces at a high temperature (50°C.) in the cases where a temperature compensation member is provided and is not.

FIG. 27 is a graph showing analysis data on the influence upon the magnetic head slider 67 by the temperature compensation member 91 in the seventh embodiment. In FIG. 27, a line (a) indicates the deformation amount variation (crown amount variation) of the slider rail surface at a high temperature (50° C.) in the case where the temperature compensation member 91 is not provided and a line (b) indicates the deformation amount variation (crown amount variation) of the slider rail surface at a high temperature (50° C.) in the case where the temperature compensation member 91 is provided. In this analysis, the material of the temperature compensation member 91 is SUS304 which is also the material of the flexure spring. The thickness and width of the temperature compensation member 91 are 38 μm and 0.5 mm, respectively.

As is clear from the graph, if the temperature compensation member 91 is provided, the deformation amount variation of the slider rail surface can be reduced to about ⅕, as compared to the case where the temperature compensation member 91 is not provided. The reason is that about ⅘ of the stress caused by the difference in linear expansion coefficient between the flexure spring 64 and slider 67 can be canceled by the stress acting in the opposite direction, caused by the difference in linear expansion coefficient between the temperature compensation member 91 and slider 67.

It has been described that in the present embodiment the deformation amount variation of the slider rail surface at the high temperature can be reduced to about ⅕. However, by appropriately determining the material (linear expansion coefficient), dimensions, etc. of the temperature compensation member 91, the deformation amount variation of the slider rail at the high temperature can be reduced to substantially zero.

Figure 28:
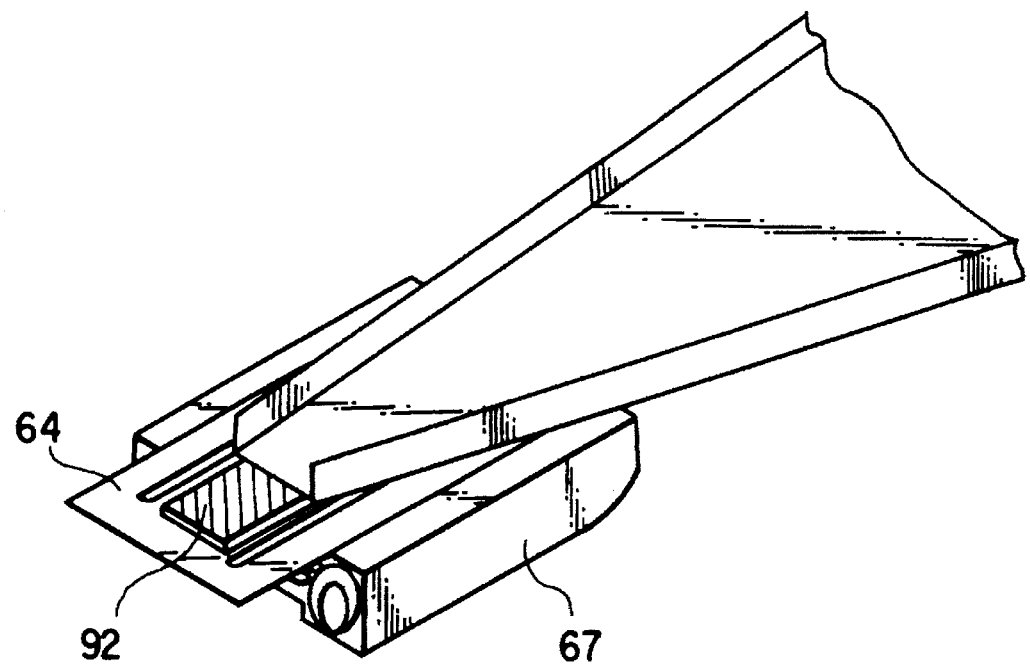
FIG. 28 is a perspective view of a magnetic head assembly according to a modification of the seventh embodiment.

FIG. 28 shows a modification of the seventh embodiment. In a magnetic head assembly as shown in FIG. 28, a temperature compensation member 92 is attached to that surface of the flexure spring 64, which is opposite to the surface thereof on which the slider is attached. It is desirable that the temperature compensation member 92 be formed of a material with a linear expansion coefficient close or equal to that of the slider 67. The temperature compensation member 92, however, should be formed of a material with a linear expansion coefficient greater than at least that of the flexure spring 64.

It is desirable that the linear expansion coefficient $\alpha t$ of the temperature compensation member 92 be determined to meet the following condition:

$$0.5 \leq \alpha t / \alpha h \leq 2.0$$

where $\alpha h$ is the linear expansion coefficient of the slider 67.

Since the temperature compensation member 92 having a lower linear expansion coefficient than the flexure spring 64 is used, part of a stress caused by a difference in linear expansion coefficient between the flexure spring 64 and slider 67 can be canceled by a stress caused by a difference in linear expansion coefficient between the flexure spring 64 and temperature compensation member 92. Thus, the deformation amount variation of the slider rail surface can be reduced.

According to each embodiment as described above, the maximum crown variation amount per unit temperature can be reduced to 1.11 nm/deg. or less, i.e. about half the maximum crown variation amount in the prior art. Thus, there is no concern that the slider comes into contact with the disk in the temperature range of the magnetic disk apparatus (0° C. to 50° C.). Moreover, since the levitation amount of the slider can be more stabilized in relation to the temperature variation, the reliability of recording/reproducing signals on the disk can be remarkably enhanced. For example, according to recording/reproducing simulation analysis of signal outputs and an error rate, the error rate can be reduced to $1/10$ to $1/100$, as compared to the prior art.

The above-described embodiments relate to individual methods for reducing the crown amount variation due to temperature variation. However, these methods may be combined and applied to the magnetic head assembly and magnetic disk apparatus.

Figure 29:
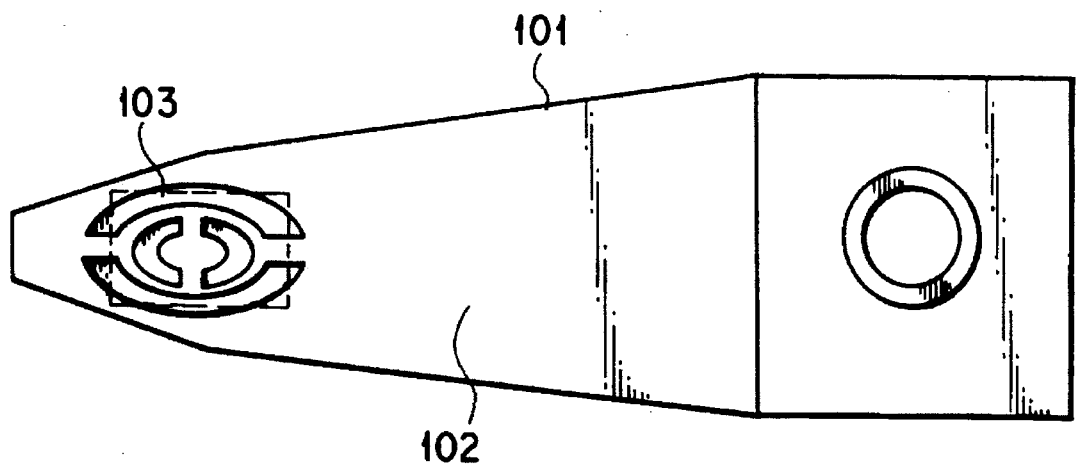
FIG. 29 is a plan view showing a magnetic head assembly applicable to the present invention, wherein a load spring and a flexure spring are integrally formed on a single thin plate spring.

The present invention is not limited to the magnetic head assemblies of the types adopted in the above embodiments. For example, as shown in FIG. 29, this invention is applicable to a magnetic head assembly wherein a load spring portion 102 and a flexure spring portion 103 are integrated on a single thin plate spring 101, as shown in FIG. 29.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A levitation-type head assembly comprising:

a magnetic head slider for performing data recording/reproducing having a first linear expansion coefficient ($\propto h$);

suspension means, having a surface adhered to said magnetic head slider, for supporting said magnetic head slider, said suspension means having a second linear expansion coefficient ($\propto s$); and temperature compensation means provided on a surface of said suspension means that is opposite to the surface adhered to said magnetic head slider, and having a third linear expansion coefficient ($\propto t$) greater than said second linear expansion coefficient ($\propto s$), said first linear expansion coefficient ($\propto h$) and said third linear expansion coefficient ($\propto t$) having a relationship expressed by $0.5 \leq \propto t/\propto h \leq 2.0$.

2. A disk apparatus comprising:

a magnetic head slider for performing data recording/reproducing having a first linear expansion coefficient ($\propto h$);

suspension means, having a surface adhered to said magnetic head slider, for supporting said magnetic head slider, said suspension means having a second linear expansion coefficient ($\propto s$); and temperature compensation means provided on a surface of said suspension means that is opposite to the surface adhered to said magnetic head slider, and having a third linear expansion coefficient ($\propto t$) greater than said second linear expansion coefficient ($\propto s$), said first linear expansion coefficient ($\propto h$) and said third linear expansion coefficient ($\propto t$) having a relationship expressed by $0.5 \leq \propto t/\propto h \leq 2.0$.

* * * * *